US 12,555,623 B2

(12) United States Patent
Thirumala et al.

(10) Patent No.: US 12,555,623 B2
(45) Date of Patent: Feb. 17, 2026

(54) ADDRESS MAPPING FOR IMPROVED MEMORY RELIABILITY

(71) Applicant: Micron Technology, Inc., Boise, ID (US)

(72) Inventors: Sandeep Krishna Thirumala, Boise, ID (US); Amitava Majumdar, Boise, ID (US); Lingming Yang, Boise, ID (US); Nevil Gajera, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 813 days.

(21) Appl. No.: 17/844,450

(22) Filed: Jun. 20, 2022

(65) Prior Publication Data

US 2023/0238049 A1 Jul. 27, 2023

Related U.S. Application Data

(60) Provisional application No. 63/302,399, filed on Jan. 24, 2022.

(51) Int. Cl.
*G11C 11/408* (2006.01)
*G11C 11/4094* (2006.01)
(Continued)

(52) U.S. Cl.
CPC ...... *G11C 11/4085* (2013.01); *G11C 11/4094* (2013.01); *G11C 11/4096* (2013.01); *G11C 29/52* (2013.01); *G06F 2212/7201* (2013.01)

(58) Field of Classification Search
CPC ............ G11C 11/4085; G11C 11/4094; G11C 11/4096; G11C 29/52; G11C 2029/0411;
(Continued)

(56) References Cited

U.S. PATENT DOCUMENTS 5,012,447 A * 4/1991 Matsuda ................ G11C 5/063
 365/206
2017/0068621 A1 * 3/2017 Watanabe ............. G06F 3/0679

OTHER PUBLICATIONS

M. Kim, J. Choi, H. Kim and H.-J. Lee, "An Effective DRAM Address Remapping for Mitigating Rowhammer Errors," in IEEE Transactions on Computers, vol. 68, No. 10, pp. 1428-1441, Oct. 1, 2019 (Year: 2019).*

(Continued)

*Primary Examiner* — Alexander Sofocleous
*Assistant Examiner* — James S Wells
(74) *Attorney, Agent, or Firm* — Wood IP, LLC; Theodore A. Wood (57) ABSTRACT

Provided is a memory system including a memory module bank comprising a plurality of memory cell arrays, each memory cell array comprising a plurality of memory cells arranged in wordlines and bitlines and a memory controller configured to receive from a central processing unit (CPU) a data byte to be stored in a wordline of the memory module bank. Also included is a logical-to-physical address mapping block (L2P AMB) configured to map a logical bitline address of the data byte to a physical bitline address of a first memory cell array of the plurality of memory cell arrays, wherein a plurality of logical bitline addresses of the data byte are shuffled to different physical bitline memory addresses of the first memory cell array. Each respective memory cell array of the plurality stores a respective bit value, corresponding to a common logical bitline address, to a different respective physical bitline in each different respective memory cell array of the plurality.

12 Claims, 5 Drawing Sheets

(51) Int. Cl.
    *G11C 11/4096*    (2006.01)
    *G11C 29/52*    (2006.01)
(58) Field of Classification Search
    CPC ........... G11C 7/02; G11C 7/00; G11C 11/408;
        G11C 7/24; G06F 2212/7201; G06F
        2212/7209; G06F 11/1068; G06F
        12/0246; G06F 11/1048
    See application file for complete search history.

(56) References Cited

OTHER PUBLICATIONS

L. Cojocar, K. Razavi, C. Giuffrida and H. Bos, "Exploiting Correcting Codes: On the Effectiveness of ECC Memory Against Rowhammer Attacks," 2019 IEEE Symposium on Security and Privacy (SP), San Francisco, CA, USA, 2019, pp. 55-71, doi: 10.1109/SP.2019.00089 (Year: 2019).*

N/A, "Preventing Row Hammer Attacks by Dynamic Indirection of Row Addresses", Technical Disclosure Commons, (Jun. 24, 2020) https://www.tdcommons.org/dpubs_series/3361 (Year: 2020).*

M. Lv, H. Sun, J. Xin and N. Zheng, "Efficient Repair Analysis Algorithm Exploration for Memory With Redundancy and In-Memory ECC," in IEEE Transactions on Computers, vol. 70, No. 5, pp. 775-788, May 1, 2021, (Year: 2021).*

Mutlu, Omur, et al., "RowHammer: A Retrospective," Apr. 22, 2019, https://arxiv.org/pdf/1904.09724.pdf.

Kim, Jeremie S., et al., "BlockHammer: Preventing RowHammer at Low Cost by Blacklisting Rapidly-Accessed DRAM Rows," 2021 IEEE International Symposium on High-Performance Computer Architecture (HPCA), 2021, pp. 345-358, doi: 10.1109/HPCA51647.2021.00037.

Ghasempour, et al., "ARMOR: A Run-time Memory Hot-Row Detector," 2015. [Online]. Available: http://apt.cs.manchester.ac.uk/projects/ARMOR/RowHammer.

Frigo, Pietro, et al., "TRRespass: Exploiting the Many Sides of Target Row Refresh," (2020) IEEE Symposium on Security and Privacy, 2020, pp. 747-762, doi: 10.1109/SP40000.2020.00090.

* cited by examiner

ADDRESS MAPPING FOR IMPROVED MEMORY RELIABILITY

CROSS REFERENCE TO RELATED APPLICATIONS

This application claims benefit to U.S. Provisional Patent Application No. 63/302,399, file 24 Jan. 2022, and entitled "A Method of Improving Reliability in Memory system (L2P Address Encoding)", the disclosure of which is incorporated herein in its entirety by reference.

TECHNICAL FIELD

The present disclosure relates generally to semiconductor memory and methods, and more particularly, to systems and methods for improved reliability in dynamic random access memory (DRAM).

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A memory controller may be used to manage the transfer of data, commands, and/or instructions between the host and the memory devices.

In recent years, advancing technologies in materials design and semiconductor fabrication techniques have ensured that the electronic components (typically transistors and capacitors) in memory circuits have shrunk dramatically in size. This has benefits; but a disadvantage is that electrical, thermal, and magnetic effects in one micro component can spill over into adjacent components. If a host computing device writes a same data value (for example, a '1' bit value or a '0' bit value) repeatedly to a memory cell, many times in succession over a short interval of time, the repetitive write operation may cause short-term electrical degradation of charge stored in an adjacent memory cell. This in turn may result in data corruption, of a form which may be referred to in some literature as "hammering."

BRIEF DESCRIPTION OF THE DRAWINGS

Advantageous designs of embodiment of the present system and method result from independent and dependent claims, the description, and the drawing. In the following, preferred examples of embodiments of the disclosure are explained in detail with the aid of the attached drawings. The drawings, which are incorporated herein and form part of the specification, illustrate the present disclosure and, together with the description, further serve to explain the principles of the disclosure and to enable a person skilled in the relevant art(s) to make and use the disclosure.

DETAILED DESCRIPTION

Figure 1:
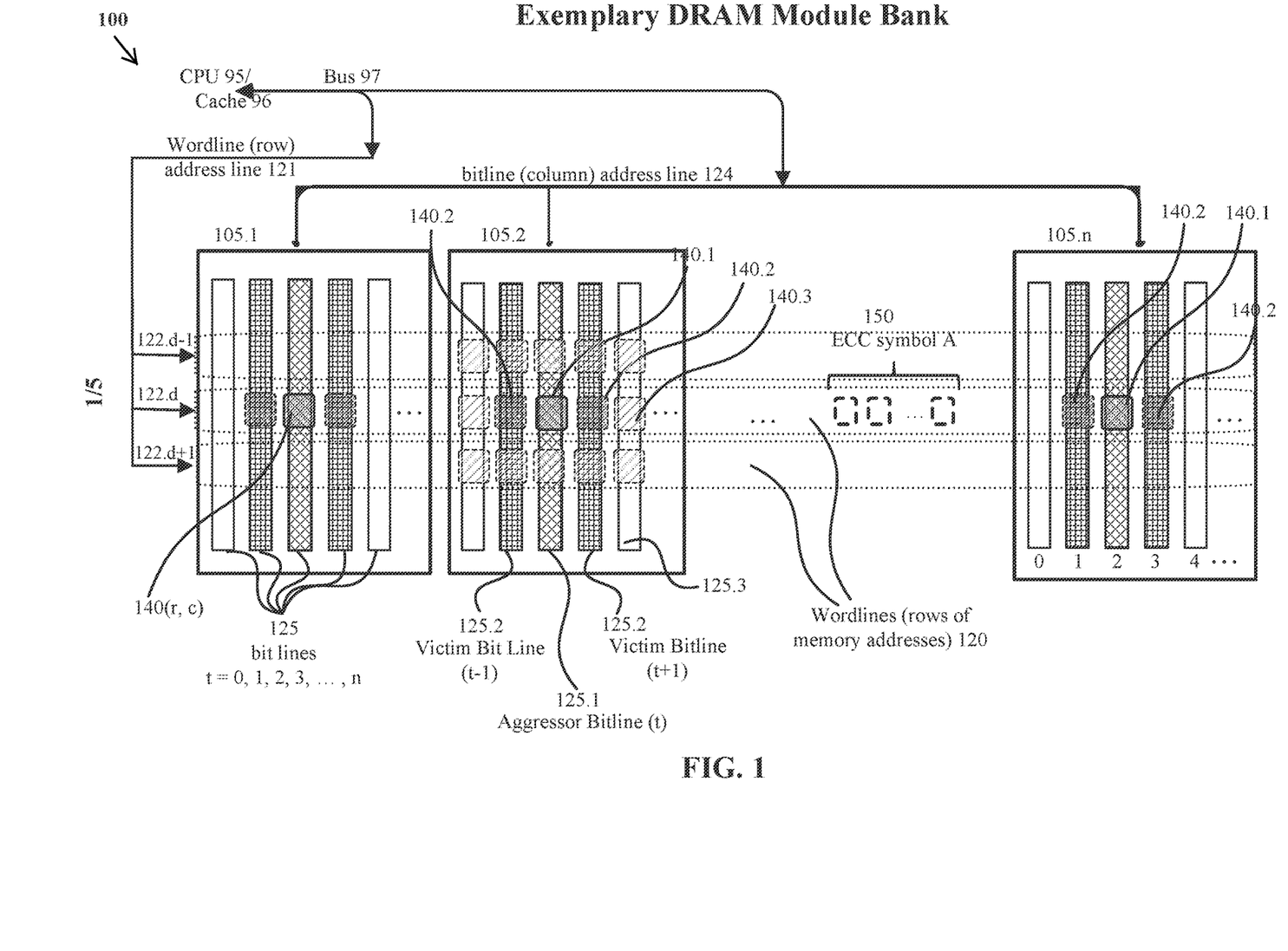
FIG. 1 illustrates an exemplary DRAM module bank.

With reference to the exemplary memory bank 100 illustrated in FIG. 1, memory cells 140 may store a single bit value of either '0' or '1'. These are typically represented, at the physical level, by two different voltage levels, for example 0 volts for a bit value of '0' and 3 volts for a bit value of '1'.

Memory cells in a first and second different memory location, such as for example 140.1 and 140.2 may be physically situated on adjacent memory locations and so be physically proximate to each other. This makes it possible for electrical, magnetic, or thermal interferences of various kinds between the first memory cell 140.1 and the second memory cell 140.2, if the first and second cells are situated at closely proximate locations in a memory cell array 105. As a result, deliberately charging/discharging in one memory cell 140 may induce motion of electrical charge at an adjacent but separate memory location (and the cell 105 at that location). This mechanism is referred to herein as "proximate charge disturbance."

It may happen—in the routine course of calculations or other computer operations, or due to deliberate cyber-attack—that a first memory cell 140.1 is repeatedly modified (that is, new data is being repeatedly written to the first memory cell 140.1, in constant or frequent time succession)—a phenomenon referred to as "row hammer". When row hammer occurs, the result is an increasing chance that data in the second, proximate memory cell 140.2 will be unintentionally corrupted due to proximate cell disturbance.

The embodiments limit or reduce the occurrence of the proximate cell disturbance mechanism by reducing the likelihood or instances of row hammer, and thereby increase memory reliability.

In some exemplary embodiments, the present system and method may be applied to DRAM 100, as is conventionally used in computers, cell phones, and numerous other electronic devices. When a particular DRAM bit line 125.1 (a column 125 of cells 140) is opened (i.e., activated) and dosed (i.e., pre-charged) repeatedly in frequent succession in time, in a particular bit line 120—that bitline 125.1 becomes an aggressor bitline 125.1. It will be noted that bitlines are sometimes referred to in the art as DRAM digit lines or bit slices, the term bitline is employed in this document.

When exemplary bit line 125.1 in a wordline 120 is hammered beyond some threshold number of times within a DRAM refresh interval, one particular cell 140.1 is repeatedly charged and discharged. As a result, one or more adjacent cells 140.2 (each cell storing a single 0|1 bit) in physically adjacent DRAM bitlines 125.2 can be flipped to the wrong value. These adjacent cells 140.2 are situated in what is referred to as victim bitlines 125.2. (It will be noted that, in contrast, other cells 140.3 which are more remote from the aggressor cell 140.1 are not subject to any proximate charge disturbance. Such cells 140.3 may be referred to, for purposes of this document, as safe cells 140.3.)

As shown in FIG. 1, if bitlines 125 are considered to be numbered as 1, 2, 3, . . . , t–1, t, t+1, . . . n, then if bitline 't' is the aggressor bitline 125.1, bitlines t–1 and t+1 are the victim bitlines 125.2.

FIG. 1 illustrates a legacy, exemplary memory module bank 100, which may for example be a DRAM module 100. DRAM module bank 100. Exemplary DRAM module bank 100 may have multiple DRAM memory cell arrays 105 (105.1, 105.2, . . . , 105.n). Each DRAM memory cell array 105 can read or write only a single binary digit (0 or 1) at a time. However, each cell array 105 has multiple DRAM cells 140 structurally arranged in an array, and linked by various address lines 121, 124. The use of the multiple cells 140 in an array 105 permits the addressing of cells at different memory addresses 122 via the address lines 121, and as defined by a central processing unit (CPU) 95 or cache memory 96.

A data bus 97 carries appropriate address values and data from the CPU 95 to DRAM module bank 100. The data bus 97 may be, for example and without limitation, a non-volatile memory express (NVMe) bus, peripheral component interconnect express (PCIe) bus, compute express link (CXL) bus, or other digital data buses known in the art or to be developed in the future.

For simplicity in this document, and only by way of example and without limitation, the system-level origination source for memory addresses to be stored and retrieved will be considered to be the CPU 95, as illustrated in FIG. 1. It will be noted that the CPU 95 and bus 97 are not part of the DRAM module bank 100, and rather are external to it.

Any one individual cell 140, storing a bit value of 0 or 1, is addressed for reading or writing by providing to a cell array 105 a wordline address 122 (which may also be referred to as a row "r") and bitline address 125 (which may also be referred to as a column "c"), and which together identify a selected cell 140(r, c).

To read a byte of data (eight bits) to be sent to the CPU 95 or to write a byte of data (as received from the CPU 95), multiple cell arrays 105 are employed, such as arrays 105.1, 105.2, . . . , 105.n. The same applies to reading or writing multiple bytes of data (e.g., 16, 32, 64, or more bits). The value 'n' may be for example and without limitation '8' (for one byte), '16', '32', '64', or some other suitable number of bits to be received from the CPU 95 and stored in a memory address associated with a wordline 120.

For example, a four byte word requires 32 bits, so 32 cell arrays 105 (n=32) may be employed for storing/retrieving a four byte word. It will be noted that additional bits, and therefore additional cell arrays 105, may be added for purposes of parity checking or other error detection, and for error correction. This is illustrated in FIG. 1 as exemplary error correcting code (ECC) codeword A 150.

In legacy DRAM systems, when a memory wordline address 122 referenced by the CPU 95 is applied to a group of cell arrays 105, each of the multiple cell arrays 105 is provided with a same, given, particular wordline 120 and bitline 125 position (as the same row 'r' and column 'c') for any single read or write operation. As a result, only one cell 140(r, c), with common designated values for 'r' and 'c', is selected in each array, but at the same position in each array (r, c). For example, and as illustrated in FIG. 1, for a given read or write operation, the selected cell 140.1 may be in bitline number T at address line 'd'; that is, cell 140.1 may be at location 140(d, t) in each of cell arrays 105.1, 105.2, . . . , 105.n.

Using this method, a different binary digit value (0 or 1) can be read from, or written to, the same respective position 140(r, c) in each respective cell array 105. The use of the multiple cell arrays 105 therefore provides for reading/writing a variety of different data values from/to the whole DRAM module bank 100 (as bytes, or as 16, 32, or 64 bit words).

The DRAM module has an array of DRAM dies (microchips) 220 (see FIG. 2, below), with each of the DRAM die 220 having multiple dies 105.1, 105.2, . . . , 105.n which may be subject to row hammer.

DRAM is typically accessed both rapidly and continuously. Reading a first cell 140.1 repeatedly, in sustained sequence, at high frequency, can attack on or both of adjacent cells 140.2. Ideally, the design, structure, and function of any ASIC, including DRAM, effectively results in an electrically insulating wall which prevents unwarranted interference between adjacent semiconductors on the ASIC.

In DRAM, however, two adjacent cells 140.1, 140.2 are physically close in space; may be connected to common electrical elements, such as common wiring or common nearby capacitors or resistors (not shown in FIG. 1); and further may share some electrical charge. The result is that repeated access to a particular aggressor cell 140.1 may have harmful effects on the electrical wall between the aggressor cell 140.1 and the victim cells 140.2. The result may be undesirable loss of charge in either or both of cells 140.2. The charge loss in one or both victim cells 140.2, cumulatively over multiple memory cycles, can result in data corruption in victim cells 140.2. The problem has become more acute over time with smaller and smaller cells.

Figure 2:
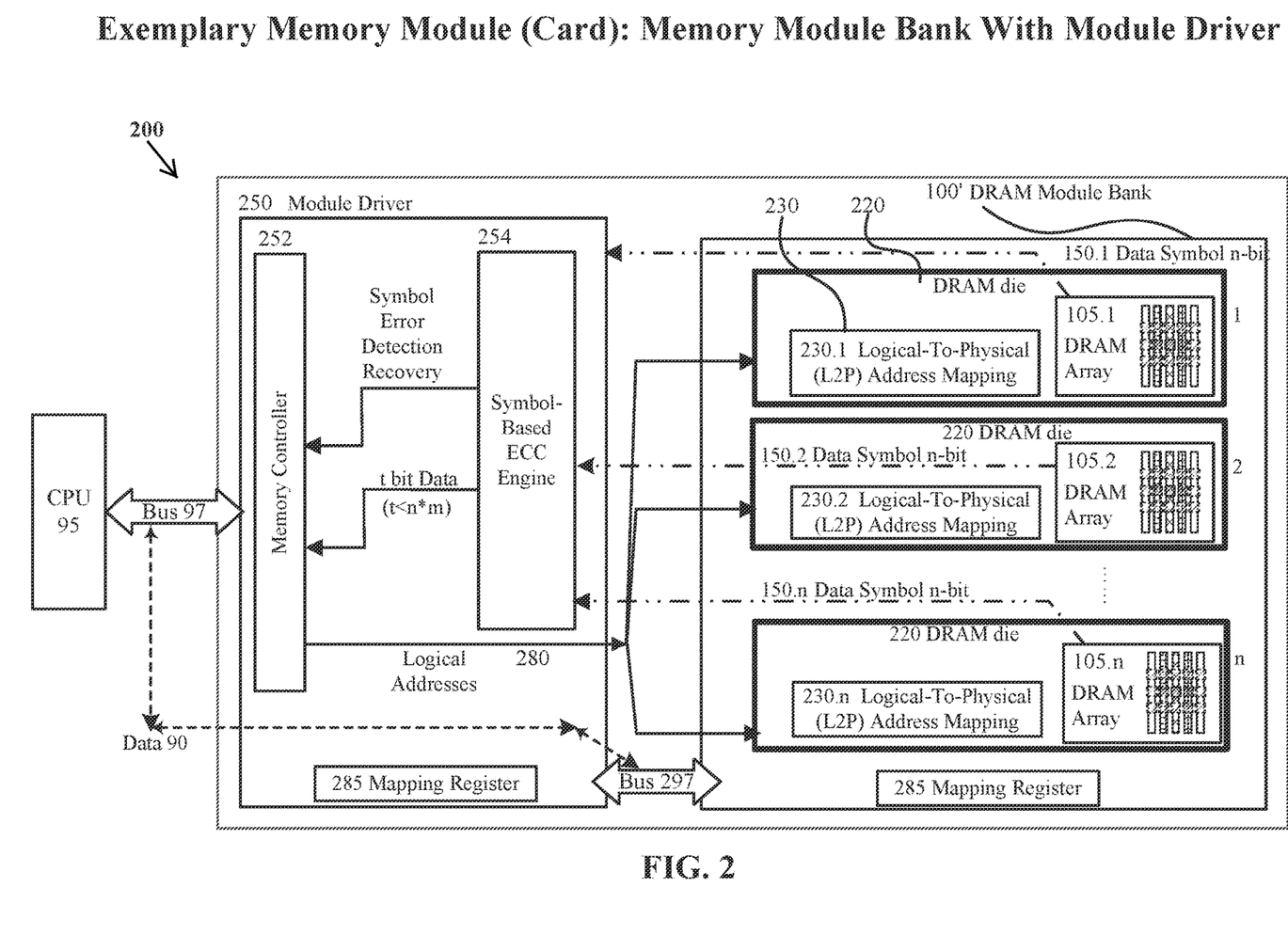
FIG. 2 illustrates an exemplary DRAM memory module card.

When the CPU 95 accesses DRAM, it accesses specific DRAM "module" 200, which is typically a physical computer card (circuit board) of the kind that may be inserted into a memory slot in a standard personal computer (not shown in the figures).

FIG. 2 provides a schematic illustration of an exemplary DRAM module 200 according to one embodiment of the present system and method. The exemplary DRAM memory module 200 may be used for example in a computer or cell phone, according to the present system and method. By way of example, the DRAM memory module 200 may take the form of a DRAM CXL card, NAND NVMe card, or a 3DXP (digital experience platform) NVMe drive non-volatile dual in-line memory module (NVDIMM). The memory module 200 may be a single ASIC with multiple interior modules or may physically include multiple ASICs mounted on a circuit board.

A DRAM module may have sixteen (16) die 220, or thirty-two (32) die, or typically 64×8 bits of data. Each die 220 provides only 16 bits. Persons skilled in the relevant arts will note that extra dies may be present for parity checking; and also, that the module or memory card may have multiple ASICs apparent to the human eye, with each ASIC having multiple dies within. For example, for each 256 bit word stored in the DRAM, each die of 16 dies might provide 16 bits of storage.

Consequently a single memory address (i.e., a common logical bitline address) is shared between the 8, or 16, or 32, or 64 dies. Referring back to FIG. 1, under an exemplary read-attack scenario, an aggressor memory cell 140.1 in aggressor bitline 125.1 may be read for example ten-thousand (10k) times in a very short time (on the order of a few microseconds). In an adjacent cell 140.2 the victim bitline 125.2 then has a high change of losing charge. With legacy technology almost every die 220 has this same row hammer problem.

Referring again to FIG. 2, the exemplary DRAM module 200 includes an exemplary DRAM module bank 100'. Exemplary DRAM module bank 100' is similar to the exemplary DRAM module 100 illustrated in FIG. 1 above, in that it includes multiple DRAM arrays 105 (105.1, 105.2, . . . , 105.n). In FIG. 2, there are 'n' DRAM dies 220 (220.1, 220.2, . . . , 220.n). Each DRAM die 200.k (k=1, . . . , n) includes a corresponding, respective DRAM array 105.k (k=1, . . . , n).

In FIG. 2 (unlike in FIG. 1), however, the exemplary DRAM module bank 100' includes multiple logical-to-physical (L2P) address mapping blocks (AMB) 230.

Thus, each DRAM die 220.k includes both a DRAM array 105.k and a corresponding, respective L2P AMB) 230.k. Each L2P AMB is electrically and communicatively linked with its respective DRAM array 105.k. (The physical coupling is not illustrated in FIG. 2.) This enables each L2P AMB 230.k to map logical addresses from the CPU 97 to a different specific physical addresses in its respective DRAM array 105.k.

As used herein, the term mapping is employed to refer to a process which reassigns a logical bitline address to a system-designated physical bitline address. While the term "mapping" is employed herein, other terms such as "shuffling" (as in "bitline shuffling"), "encoding" (as in "bitline encoding"), or "swapping" (as in "bitline swapping") could be reasonably employed within the scope of the present description, and consistent with conventional applications of the terms "encoding" or "swapping." The term "mapping" is employed for convenience as being one suitable term among other possible choices.

As illustrated in FIG. 2, the exemplary memory module 200 also has a module driver 250. The module driver 250 includes a module memory controller 252 which is configured to receive data 90 from CPU 95 via bus 97, and then transfer the data 90 to the DRAM module bank 100'. The module memory controller 252 also receives data 90 from the DRAM module bank 100' for routing to CPU 95. The memory controller 252 may also perform other DRAM control functions known in the art which are not documented here.

The module driver 250 also includes a symbol-based ECC engine 254 which is configured to detect parity errors in the DRAM arrays 105, and to correct those errors. In an embodiment, a data bus 297 or other digitally communicative coupling may transfer data, memory addresses, timing information, and other essential or useful digital data between the module driver 250 and the DRAM module bank 100'.

In a first embodiment illustrated in FIG. 2, the DRAM module driver 250 routes data 90 to the DRAM dies 220 according to logical memory addresses 280 received from the CPU 95. The L2P address mapping blocks 230, which may be physically situated on the DRAM dies 220, perform a mapping of logical addresses to physical addresses for routing via bitline address lines 120.

In an alternative embodiment, L2P address mapping may be performed by an L2P address mapping block situated within module driver 250, and possibly within memory controller 252. L2P address mapping may also be performed by hardware and/or firmware elements which are distributed among both of the module driver 250 and the DRAM module bank 100'.

Figure 3:
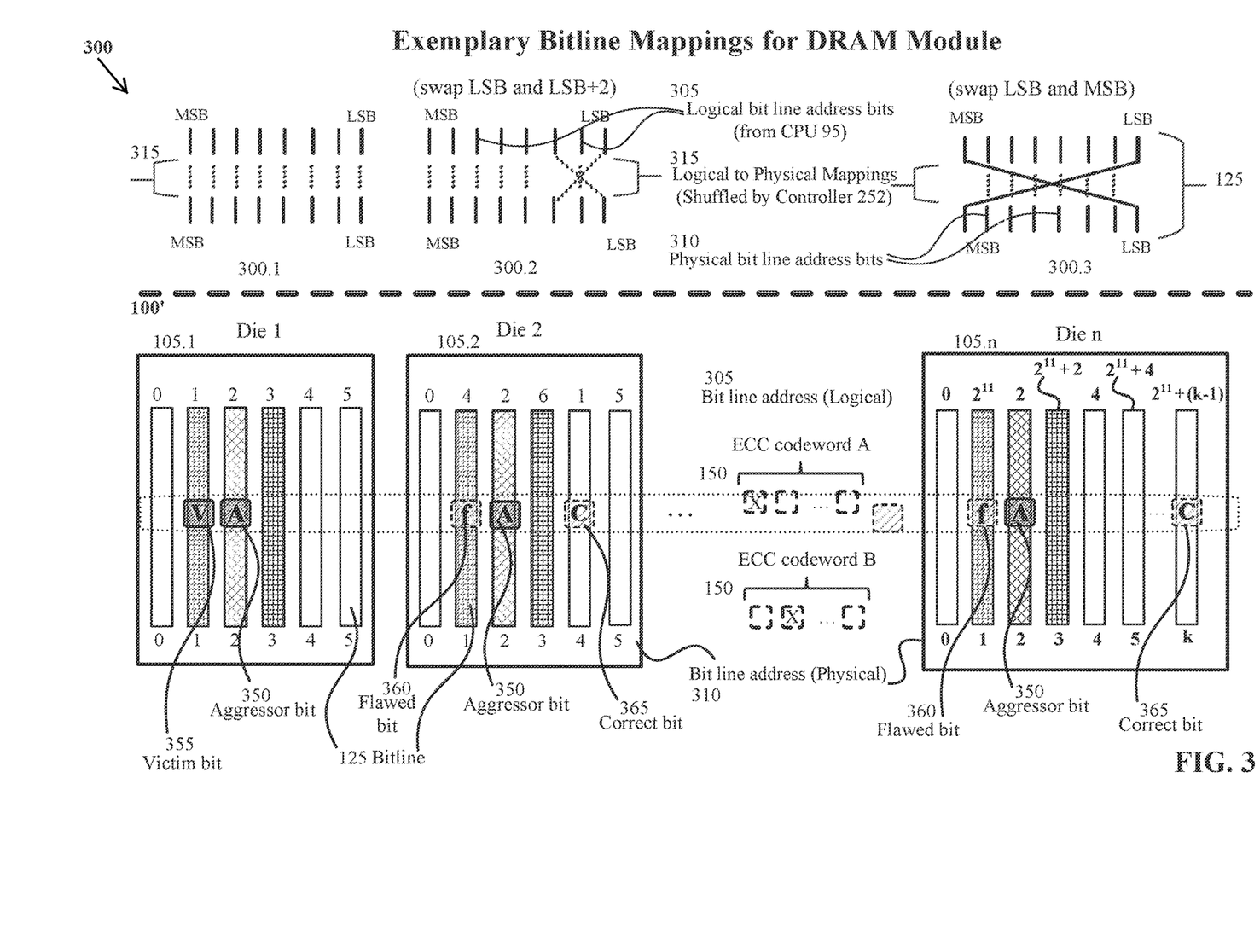
FIG. 3 illustrates an exemplary DRAM module bank with exemplary bitline mappings for a DRAM array.

FIG. 3 illustrates three exemplary instances of bitline mappings 300 according to the embodiments, and the corresponding effects as implemented on bitlines 125 on an exemplary DRAM module bank 100'. Exemplary DRAM module bank 100' is substantially similar to the exemplary DRAM module bank 100 of FIG. 1. However, in FIG. 3 the exemplary DRAM module bank 100' is illustrated as operating in conjunction with the L2P address mapping blocks 230 illustrated and described above in conjunction with FIG. 2.

Bitlines 125 are "swapped" during the data storage process, or may also be said, equivalently, to be "shuffled." Thus, for the same particular logical input address from the CPU 95, different physical bitlines 125 are accessed on the different die 105. Therefore, the order of the bitlines used for storage is shuffled from one die to the next, with each die 105 having a different bitline ordering. Persons skilled in the art will appreciate that the ECC code-order is thereby also changed, so the ECC code order perspective is no longer the same for the physical memory addresses.

Mapping of addresses is performed by a mapping on board the DRAM die 220 via an L2P address mapping block 230 of the DRAM die 220, or via an L2P block 230 of the module driver 250; and may be managed via hardware or using firmware or software. Logical bitline addresses are the same from die to die, as addressed from the CPU or cache perspective, with one single bitline address for all DRAM arrays 105. However, in the embodiments each DRAM die 220 can map that one common logical address 280 to different respective physical bitline addresses for each respective DRAM array module 105 of the DRAM module bank 100'.

When the logical addresses 280 from the CPU 95 are the same logical addresses, different physical bitline addresses are employed on each DRAM die 105. The embodiments configure the mapping so that the different physical bitline addresses 310 are distinctive and far apart on most of the dies 105, so at most one DRAM die 105 has broken user data in the form of a victim bit 355. Accordingly, the DRAM die will exhibit at most one (1) bitline error per wordline address 122.

In FIG. 3, a first bitline mapping 300.1 simply maps each physical bitline address bit 310 to a same-numbered logical bitline address bit 305. The first exemplary bitline mapping 300.1 may be referred to as identity mapping.

A second exemplary bitline mapping 300.2, referred to as a nearby mapping, essentially swaps a physical less significant bit (LSB) with a more significant bit (MSB) not immediately adjacent, as illustrated in FIG. 3. A third exemplary bitline mapping 300.3, referred to as a far mapping, swaps a low-order bit with a much higher order-bit.

These exemplary mappings are established via the memory controller 252 of module driver 250. The memory controller 252 establishes and tracks specific physical-to-logical mappings 315 for each bitline 125 in each die 105. FIG. 3 further illustrates the results of these exemplary mappings for three exemplary die 105.

For a first die 105.1, the identity mapping 300.1 may be applied. In this case, each physical bitline value 1, 2, 3, . . . , n is mapped to a same logical bitline address 1, 2, 3, . . . , n. In the event of row hammering, an aggressor bit 350 (also labelled 'A' in the figure) may corrupt the data value stored in an adjacent victim bit 355 (labelled 'V' in the figure). In that event, when victim bit 355 is read out to the CPU 95, a corrupted (incorrect) data value will be read out.

For another example second die 105.2, a nearby mapping 300.2 may be applied. In this case, one or more physicals bitline values {'1', '2', '3', ..., 'n'} are mapped to different logical bitline address which may be local or nearby. In the example shown, physical bitlines {'1', '3', '4'} are mapped to logical address values {'4', '6', '1'}, respectively. This means that the bit value (a '0' or '1') which the CPU 95 has designated as being stored in bitline {'1'} is actually stored in physical bitline {'4'}. Similarly the bit value (0 or 1) which the CPU 95 has designated as being stored in bitline {'6'} is actually stored in physical bitline {'3'}. Similarly the bit value ('0' or '1') which the CPU 95 has designated as being stored in bitline {'1'} is actually stored in physical bitline {'4'}.

Under a hammering attack, there may be an aggressor bit 350 in bitline {'2'}. An adjacent bit 360 in bitline {'1'} may again be corrupted as a result. In this instance, however, we employ in this document the term "flawed bit" (designated with an for this bit. The flawed bit 360 may be corrupted due to hammering from the aggressor bit 350. However, the flawed or corrupted value in bit 360 will not corrupt a pertinent data read itself. This is because, due to the mapping discussed immediately above, the pertinent bit value for the read operation is stored in bitline {'4'} as correct bit 365 ('C'). Correct bit 365 is correct (that is, not corrupted), because it is sufficiently distant—that, is physically remote on the die—from the aggressor bit 350, such that there is limited or no electrical/magnetic/thermal interference between the aggressor bit 350 and the correct bit 365.

In a third example, for a third die 105.$n$, a far mapping 300.3 may be applied. In this case, one or more physicals bitline value {'1', '2', '3', ..., 'n'} are mapped to different logical bitline address which may be numerous values away. Physical bitlines {'1', '3', '5', and 'k'} are mapped to logical address values $\{2^{11}, 2^{11}+2, 2^{11}+4, \text{ and } 2^{11}+(k-1)\}$, respectively. This means that the bit value (a '0' or '1') which the CPU 95 has designated as being stored in bitline $\{2^{11}\}$ is actually stored in physical bitline {'1'}. Similarly the bit value ('0' or '1') which the CPU 95 has designated as being stored in bitline $\{2^{11}+2\}$ is actually stored in physical bitline {'3'}. Similar considerations apply for logical storage locations $\{2^{11}+2\}, \{2^{11}+(k-1)\}$ and respective physical storage locations {'5'} and {'k'}.

Under a hammering attack, there may be an aggressor bit 350 ('A') in bitline {'2'}. Again also, an adjacent flawed bit 360 ({'f'}) in bitline {'1'} may again be corrupted as a result, However, due to the mapping discussed immediately above, the pertinent bit value for the read operation is stored in bitline {'k'} as correct bit 365 ('C'). Correct bit 365 is correct (i.e., not corrupted), because it is sufficiently distant (physically remote on the die) from the aggressor bit 350. This distance limits and no electrical/magnetic/thermal interference between the aggressor bit 350 and the correct bit 365.

In the embodiments, the logical bitline addresses 305 are shuffled to physical bitline addresses 310 according to a mapping schema 315. This mapping ensures that any first physical bit, which may be an aggressor bit 350 in a first aggressor bitline, similar to the first aggressor bitline 125.1 as shown in FIG. 1, is directly adjacent to a second physical victim bit 355. The second physical victim bit 355 may be a victim bit in a location similar to a second directly adjacent victim bitline 125.2 in FIG. 1, in at most one memory cell array 105 of the plurality of memory cell arrays 105.

The embodiments establish a ceiling of at most one bitline error per wordline 120, even if in a hammering attack the same, identical data 90 is written to a given wordline many times in succession. Stated another way, under a hammering attack, at most one die of the 1, 2, ..., n dies will suffer from a corrupted bit under a hammering attack.

With only a single bit error, the symbol-based ECC engine 254 can recover the original correct data via low power chip kill (LPCK) or cyclic redundancy check (CRC), or in general using some form of parity checking or similar. As a result, if just one die 105 fails (has corrupted data), the correct wordline data can be readily recovered with minimal hardware and minimal processing. The embodiments configure the memory module card 200 to suffer at most single bit errors—that is, error on at most one die 105— in the face of a hammering attack. Consequently, there is a high likelihood that errors that are detected can be corrected, as above. Legacy systems were previously susceptible to unrecoverable errors in the face of just 2K row attacks, while the embodiments lend themselves to reliability (error correction) in the face of at least 10 k row hammer access.

Figure 4:
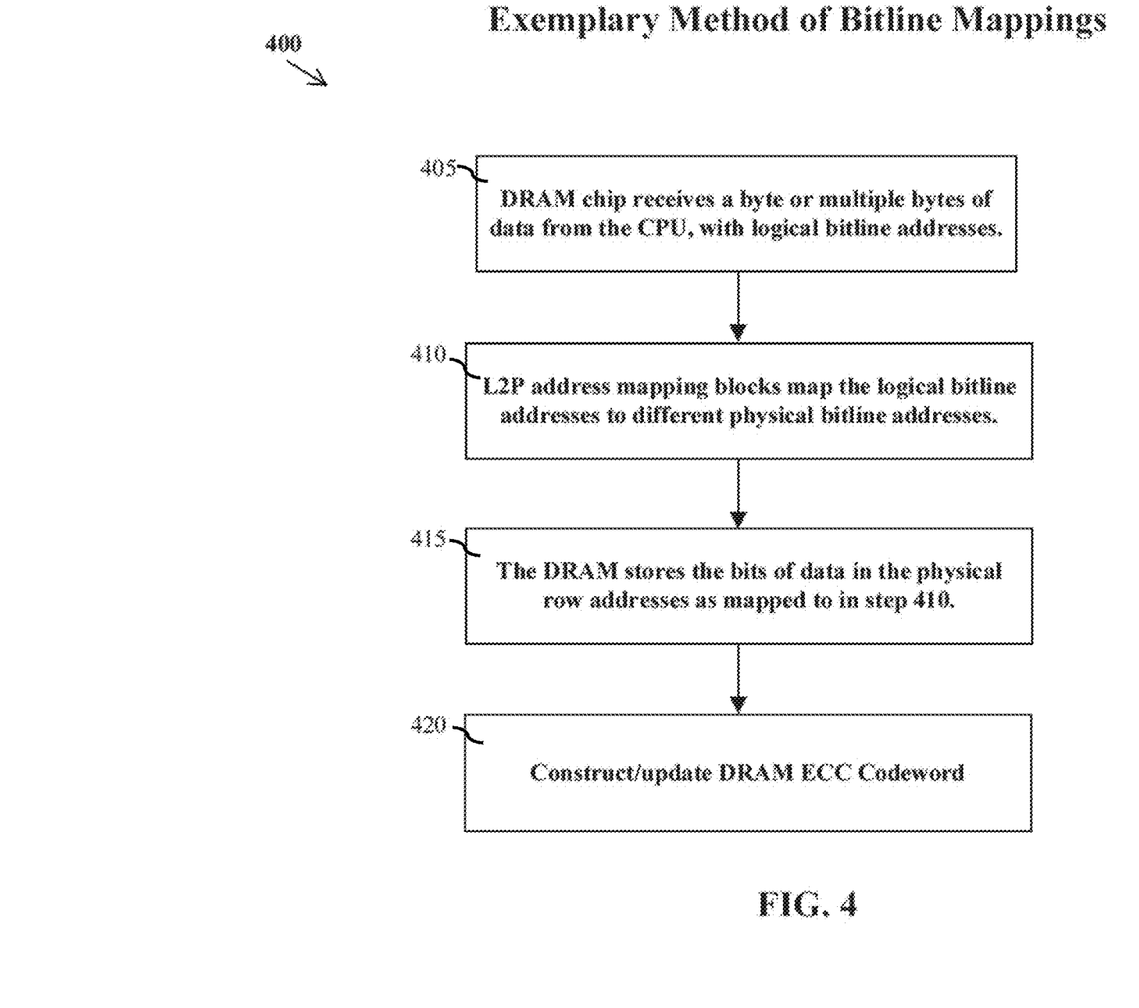
FIG. 4 presents a flow chart of an exemplary method for bitline mappings in a DRAM array.

FIG. 4 presents an exemplary method 400 for reducing row hammer attacks in DRAM media, summarizing many of the elements described above.

Method 400 begins with block 410. In a block 405, the DRAM chip receives a byte or multiple continuous bytes of data from the CPU 95, designated for storage in a single wordline 120 at a designated wordline address 122. The designated storage address 122 includes a sequence of bitline addresses 125 for respective DRAM dies 125. The embodiments treat these bitline addresses 125 as logical bitline addresses 305.

In block 410, one or more L2P address mapping blocks 230 map the logical bitline addresses 305 to different physical bitline addresses 310. In block 415, the memory controller 252, and/or the L2P address mapping blocks 230, and/or other memory controller elements (not illustrated in the figure) of the DRAM module bank 100' and/or the DRAM dies 105 stores the bits of data in the physical bitline addresses 310.

In block 420, the symbol based ECC engine 254 generates an ECC codeword 150 based on the data 90 as stored in the mapped physical bitline addresses 310. The generation of the ECC codeword 150 is employed as an element of error correction (discussed below).

Persons skilled in the art will note that an ECC codeword 150 may itself also be considered to be or viewed as a symbol stored on the die 105. Thus, in some discussions, the die may be understood as having both data symbols for data storage, and codeword symbols for error correction.

During read operations, suitable control elements 232, 250 of the DRAM module may retrieve data from the module banks and map the data addresses back from the physical memory addresses to the suitable logical addresses for transfer to the CPU 95. The exemplary memory module 200 of FIG. 2 may have one or more mapping registers 285 to maintain a dynamic record of the mappings 315 between logical bitline addresses 305 and physical bitline addresses 310.

In one embodiment, the L2P-AMB(s) 230 and the mapping registers 285 may be separate ASICs or physically separate modules within an ASIC. Alternatively, the L2P-AMB(s) and the mapping register(s) may be one integrated element 230/285.

In the embodiments, each die 220 employs a different logical-to-physical mapping schema 315 in its DRAM array 105, as compared with any other die 220 on the memory card 200. The use of different physical mapping schema 315 (for example, 315.2, 315.2, ..., 315.$n$) ensures that at most one die 105 will fail on any one DRAM card 200.

The choice of exact mapping schema 315 may be implementation dependent, and various mapping schema 315 may be employed. In some embodiments, the choice of a particular logical to physical mapping schema 315.*k* may be hardcoded for each DRAM die 'k'. In an alternative embodiment, different mapping schemas 315 may be employed over the duration of real-time, based for example on a real-time determination of which bitlines appear to be most subject to row hammering, or based on other dynamically determined operational parameters for a dynamic mapping schema or system 315.

As discussed above, under a row hammering attack, one die 220 with its one DRAM array 105 may display a corrupted bit data value in its DRAM array 105. To compensate for this failure of at most one die 220, the embodiments employ an error detection and error recovery scheme. It will be noted that without error correction, if one die 220 fails, all the data on the memory module 200 is corrupted.

Each die 220 on the DRAM module bank 100' provides for one symbol 150. A symbol (e.g., codeword) is a series of 'n' bits, where n=the number of dies 220 in the DRAM module bank 100' (or equivalently, n=the number of DRAM arrays 105 in the DRAM module bank 100'). In one embodiment, error correction need only be based on one symbol because the method is predicated on at most one die 220 having an erroneous bit value, with the remaining dies 220 being assumed to be correct.

Figure 5:
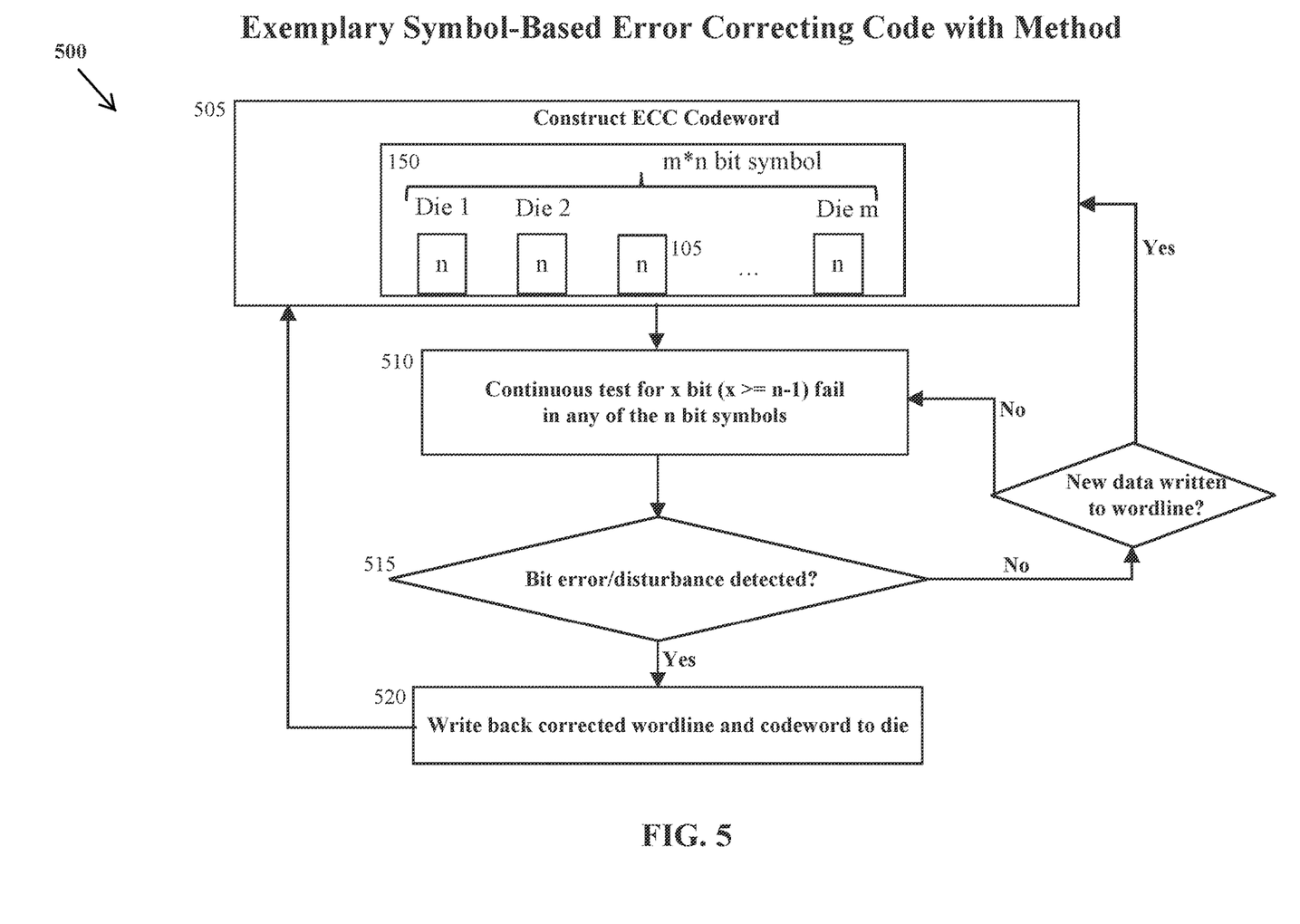
FIG. 5 illustrates an exemplary method for error code correction in a DRAM module bank.

FIG. 5 presents a flow chart for a method 500 for exemplary symbol-based ECC operations in one embodiment. In block 505, the method generates an error-correcting codeword 150 based on the 'n' mapped bits in the 'm' dies 105. The ECC codeword 150 may be based on parity checking, or on other codeword constructs known in the art.

In block 510, the present method continuously tests for a failure in any one of the 'n' bit symbols in the relevant wordline 120. In block 515, the present method determines if a bit disturbance/error has been detected. If "Yes", the present system determines the correct wordline and also generates the corrected ECC codeword and writes them back to the affected die. The method then returns to block 505.

If in block 515 no bit error/disturbance is detected, the method determines if new data has been written to the wordline. If 'No', the method returns to block 510, continuously monitoring for bit errors. If 'Yes' (new data has been written to the wordline), the method returns to block 505, constructing a new appropriate codeword 150.

Persons skilled in the relevant arts will note that the method steps shown are exemplary only. In some embodiments, some steps may be omitted and others added. Further, in some embodiments the order of some steps may be changed, and some steps may be performed in parallel or combined.

The ECC data/codeword 150 may be generated based on one symbol, or from several symbols 150 (with one symbol 150 per die 105). When one entire symbol/die fails (out of many multiple symbols/dies), the correct data 90 can be re-constructed from the rest of symbols 150, and the single corrupted symbol is refreshed with corrected data.

As a result, and during a given time period, each of the multiple die are seeing a different read/write pattern. This lowers the chance of failing all dies at the same time, especially under attack.

A symbol-based die level ECC engine has a corresponding error handling function block. For each memory storage (of a byte or multi-byte word), an ECC data/codeword is generated from several symbols (a symbol being a '0' or '1', with one symbol per die). If one entire symbol/die fails (out of many symbols/dies), the correct data can be re-constructed from the rest of symbols and the corrupted symbol will be refresh with corrected data.

In an alternative embodiment, it may be the case that more than one symbol could fail. If such outcomes are anticipated, some embodiments of the present system and method may employ more advanced error correction to correct more symbols.

In some embodiments of the present system and method, the error reduction and error control features are employed in conjunction with memory controller 252 on the module driver 250, which can be a CXL memory controller. In one embodiment, the memory controller 252 provides most or all of the system hardware (including for example and without limitation the L2P address mapping block(s) 230 and the mapping register(s) 285, so that the DRAM module 100 may employ known, conventional DRAM die 230 and DRAM arrays 105.1.

In such embodiments, the memory controller 252 supports most or all of the memory address swapping and error correction. Placing the essential hardware on the memory controller 252 then ensures that the present system and method can work for generic, legacy DRAM memory 100. The memory controller 252 then routes the logical memory 305 to different physical memory locations 310.

In legacy memory chip systems, any single particular respective, logical address request 280 will be targeted towards a corresponding, particular respective physical address location on a chip. In the present system and method, an L2P AMB 230 ensures that for any single, given logical address 280 from the CPU 95, each memory chip die 105 will access a different physical address 310 successively upon successive storing events. The effect of having the L2P AMB 230 is that, within a given time period, each of the die 105 are seeing different read/write patterns. This lowers the chances of failing all dies 105 at the same time, especially under a digital hammering attack scenario.

The use in some instances of single decimal digits for bits, bytes, or bitlines is purely for convenience and not limiting; either of both of logical or physical memory addresses may be any number of bytes suitable for digital logic systems, such as four bytes, eight bytes, sixteen bytes, thirty-two bytes, sixty-four bytes, or other byte lengths not enumerated here. The present system and method may be employed with numerous different memory chip designs, numerous bus designs, numerous addressing systems and varied memory location schemas, both logical and hardwired/physical.

In particular, the present system and method addresses the problem that physically proximate memory locations on a semiconductor memory system can sometimes induce electrical disturbances in each other. In some embodiments of the present system and method a "semiconductor memory system" may reside on a single circuit card or even a single application specific integrated circuit (ASIC) and may be referred to synonymously and in brief as a "memory bank."

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope of the disclosure. Therefore, it is to be understood that, within the scope of the appended claims, the disclosure may be practiced other than as specifically described herein.

For example, various aspects of the present disclosure can be implemented by software, firmware, hardware (or hardware represented by software such, as for example, Verilog or hardware description language instructions), or a combination thereof. After reading this description, it will become apparent to a person skilled in the relevant art how to implement the disclosure using other computer systems and/or computer architectures.

It should be noted that the simulation, synthesis and/or manufacture of the various embodiments of this disclosure can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools).

This computer readable code can be disposed in any known computer usable medium including semiconductor, magnetic disk, optical disk (such as CD-read only memory (ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets. It is understood that the functions accomplished and/or structure provided by the systems and techniques described above can be represented in a core (such as a graphics processing unit core) that is embodied in program code and can be transformed to hardware as part of the production of integrated circuits.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, is not intended to limit the present disclosure and the appended claims in any way.

What is claimed:

1. A system, comprising:
a memory comprising a plurality of memory cell arrays, each memory cell array comprising a plurality of memory cells arranged in wordlines and bitlines;
a memory controller configured to receive from a central processing unit (CPU) a data byte to be stored in a wordline of the memory of a memory module bank; and
a logical-to-physical address mapping block (L2P AMB) configured to shuffle a plurality of logical bitline addresses of the data byte to different physical bitline addresses across the plurality of memory cell arrays according to different respective mapping schemas, such that no two logically adjacent bits of the data byte are stored in physically adjacent bitlines in more than one of the memory cell arrays;
an error correcting code (ECC) engine configured to generate an ECC codeword based on the respective bit values stored in the different respective physical bitlines for each different respective memory cell array of the plurality;
wherein the ECC engine is configured to change an order of the ECC codeword based on the shuffling of the plurality of logical bitline addresses of the data byte during storage of the respective bit value; and
wherein the different respective mapping schemas include, at least:
an identity mapping schema configured to map each logical bitline address to a same numbered physical bitline address in the memory cell array;
a nearby mapping schema configured to swap a least significant bit (LSB) of the logical bitline address with a least significant bit plus two bits (LSB+2) of the logical bitline address to generate a least significant bit (LSB) of the physical bitline address swapped with a more significant bit (MSB) of the physical bitline address; and
a far mapping schema configured to shuffle the logical bitline addresses to the physical bitline address according to the following equation $2^{\wedge}11+(k-1)$, where k is the physical bitline address.

2. The memory system of claim 1, wherein, as a result of the shuffled logical bitline addresses, a row hammering attack on the memory module bank causes each memory cell array to exhibit at most a single bit error per wordline, which the ECC engine is configured to detect and correct.

3. The memory system of claim 2, wherein the ECC engine is further configured to detect the single bit error via the ECC codeword and to correct the single bit error based on the ECC codeword.

4. The memory system of claim 3, wherein the ECC engine is further configured to indicate a presence of an uncorrectable error upon detecting that more than one bit of the data byte contains an error.

5. A module driver, comprising:
a memory controller configured to receive from a central processing unit (CPU) a data byte to be stored in a wordline of a memory module bank;
a bus for coupling the module driver with the memory module bank, wherein the memory module bank comprises a plurality of memory cell arrays, each memory cell array comprising a plurality of memory cells arranged in wordlines and bitlines; and
a logical-to-physical address mapping block (L2P AMB) which is configured to shuffle a plurality of logical bitline addresses of the data byte to different physical bitline addresses across the plurality of memory cell arrays according to different respective mapping schemas, such that no two logically adjacent bits of the data byte are stored in physically adjacent bitlines in more than one of the memory cell arrays;
an error correcting code (ECC) engine configured to generate an ECC codeword based on the respective bit values stored in the different respective physical bitlines for each different respective memory cell array of the plurality;
wherein the ECC engine is configured to change an order of the ECC codeword based on the shuffling of the plurality of logical bitline addresses of the data byte during storage of the respective bit value; and
wherein the different respective mapping schemas include, at least:
an identity mapping schema configured to map each logical bitline address to a same numbered physical bitline address in the memory cell array;
a nearby mapping schema configured to swap a least significant bit (LSB) of the logical bitline address with a least significant bit plus two bits (LSB+2) of the logical bitline address to generate a least significant bit (LSB) of the physical bitline address swapped with a more significant bit (MSB) of the physical bitline address; and a far mapping schema configured to shuffle the logical bitline addresses to the physical bitline address according to the following equation $2^{11}+(k-1)$, where k is the physical bitline address.

6. The module driver of claim 5, wherein, as a result of the shuffled logical bitline addresses, a row hammering attack on the memory module bank causes each memory cell array to exhibit at most a single bit error per wordline, which the ECC engine is configured to detect and correct.

7. The module driver of claim 6, wherein the ECC engine is further configured to detect a single bit error via the ECC codeword and to correct the single bit error based on the ECC codeword.

8. The module driver of claim 7, wherein the ECC engine is further configured to indicate a presence of an uncorrectable error upon detecting that more than one bit of the data byte contains an error.

9. A method comprising:
receiving a byte of data at a memory card;
receiving a storage address for the byte of data, where in the storage address comprises a logical bitline address for a plurality of memory dies of the memory card;
shuffling a plurality of the logical bitline addresses of the data byte to a plurality of respective different physical bitline addresses across the plurality of memory dies, according to different respective mapping schemas such that no two logically adjacent bits of the data byte are stored in physically adjacent bitlines in more than one of the memory dies;
storing the bits of the byte of data in memory cells at the shuffled physical bitline addresses across the plurality of memory dies;
generating, via an error correcting code (ECC) engine of the memory card, an ECC codeword based on the bits of the byte of data as stored in the shuffled physical bitline addresses;
changing via the ECC engine an order of the ECC codeword based on the shuffling of the plurality of logical bitline addresses of the data byte during storage of the respective bit value; and
wherein the different respective mapping schemas include, at least:
an identity mapping schema configured to map each logical bitline address to a same numbered physical bitline address in the memory cell array;
a nearby mapping schema configured to swap a least significant bit (LSB) of the logical bitline address with a least significant bit plus two bits (LSB+2) of the logical bitline address to generate a least significant bit (LSB) of the physical bitline address swapped with a more significant bit (MSB) of the physical bitline address; and
a far mapping schema configured to shuffle the logical bitline addresses to the physical bitline address according to the following equation $2^{11}+(k-1)$, where k is the physical bitline address.

10. The method of claim 9, wherein the method further comprises, as a result of the shuffled logical bitline addresses, causing the memory card under a row hammering attack to exhibit at most a single bit error per wordline, which the ECC engine is configured to detect and correct.

11. The method of claim 10, wherein the method further comprises:
detecting the single bit error in the byte of data using the ECC codeword; and correcting the single bit error using the ECC codeword.

12. The method of claim 9, wherein the method further comprises: generating a plurality of respective ECC codewords for a plurality of respective memory dies of the memory card.

* * * * *